(12) United States Patent
Weichs et al.

(10) Patent No.: US 6,177,052 B1
(45) Date of Patent: Jan. 23, 2001

(54) DEVICE FOR CLEANING OF FLUE GAS

(75) Inventors: Hermann Weichs, Neumarkt-Sankt Veit; Andreas Friedl, Burghausen, both of (DE)

(73) Assignee: FHW-Brenntechnik, GmbH, Neumarkt-Sankt Veit (DE)

( * ) Notice: Under 35 U.S.C. 154(b), the term of this patent shall be extended for 0 days.

(21) Appl. No.: 09/011,731

(22) PCT Filed: Feb. 19, 1996

(86) PCT No.: PCT/DE96/01542

§ 371 Date: Jun. 22, 1998

§ 102(e) Date: Jun. 22, 1998

(87) PCT Pub. No.: WO97/06874

PCT Pub. Date: Feb. 27, 1997

(30) Foreign Application Priority Data

Aug. 18, 1995 (DE) ............................................. 195 30 497

(51) Int. Cl.[7] ............................. B01D 53/80; B01F 7/00
(52) U.S. Cl. ........................ 422/168; 422/171; 422/172; 422/224; 422/225; 366/186; 366/301; 366/607
(58) Field of Search ................................. 422/168–172, 422/178, 269, 271, 224–225; 366/186, 307, 607, 292, 300, 301, 325.3

(56) References Cited

U.S. PATENT DOCUMENTS

| | | | |
|---|---|---|---|
| 870,748 | * 11/1907 | Selg | 366/607 |
| 1,906,735 | * 5/1933 | Boynton et al. | 366/186 |
| 3,223,290 | * 12/1965 | Schuld | 366/607 |
| 3,807,702 | * 4/1974 | Grillo et al. | 366/325.3 |
| 4,289,579 | * 9/1981 | Forsberg | 366/186 |
| 4,337,583 | * 7/1982 | Harris | 366/607 |
| 4,755,061 | * 7/1988 | Goins | 366/186 |
| 5,104,524 | * 4/1992 | Eiben et al. | 422/225 |

FOREIGN PATENT DOCUMENTS

203430 * 12/1986 (EP) .
342559 * 11/1989 (EP) .

* cited by examiner

Primary Examiner—Hien Tran
(74) Attorney, Agent, or Firm—Shaffer & Culbertson, LLP

(57) ABSTRACT

The invention pertains to a device for cleaning flue gas, with a container (31) to which raw gas and an adsorbant/absorbant for cleaning of the raw gas can be supplied via at least one supply opening (33) and from which the cleaned gas can be removed via at least one outlet opening (35), whereby moveable built-in parts (39) are located in the container (31), whereby the moveable built-in parts (39) have flexible swirling elements (43).

21 Claims, 6 Drawing Sheets

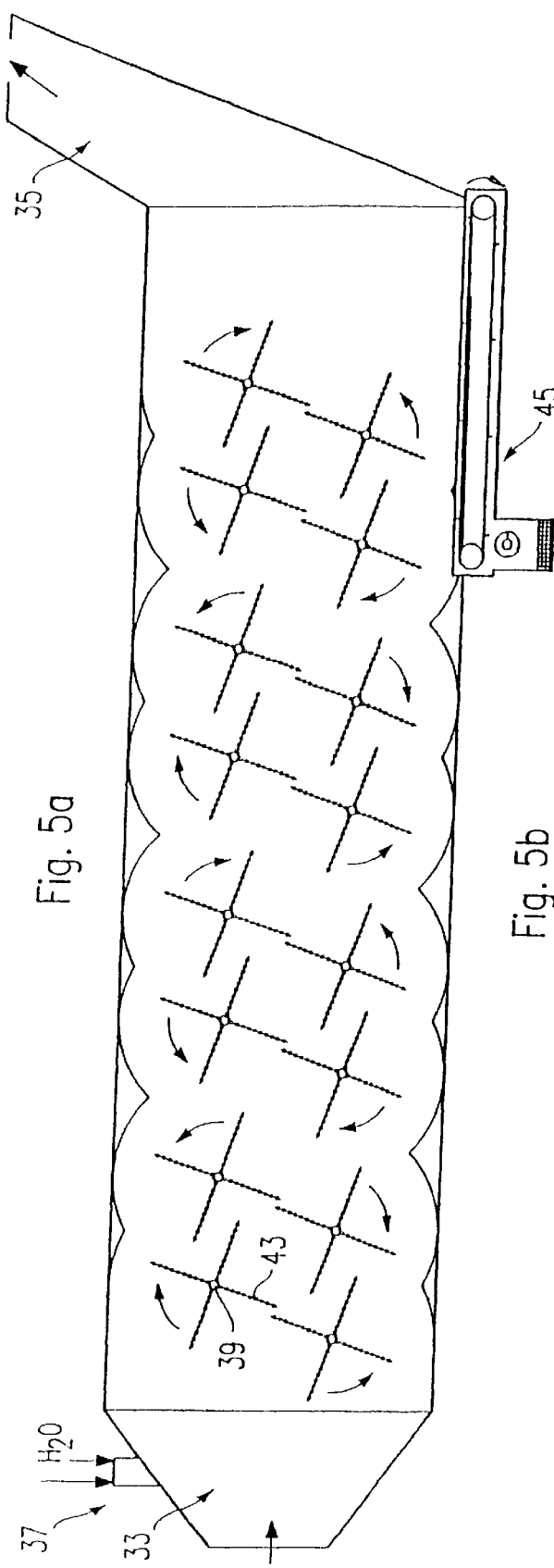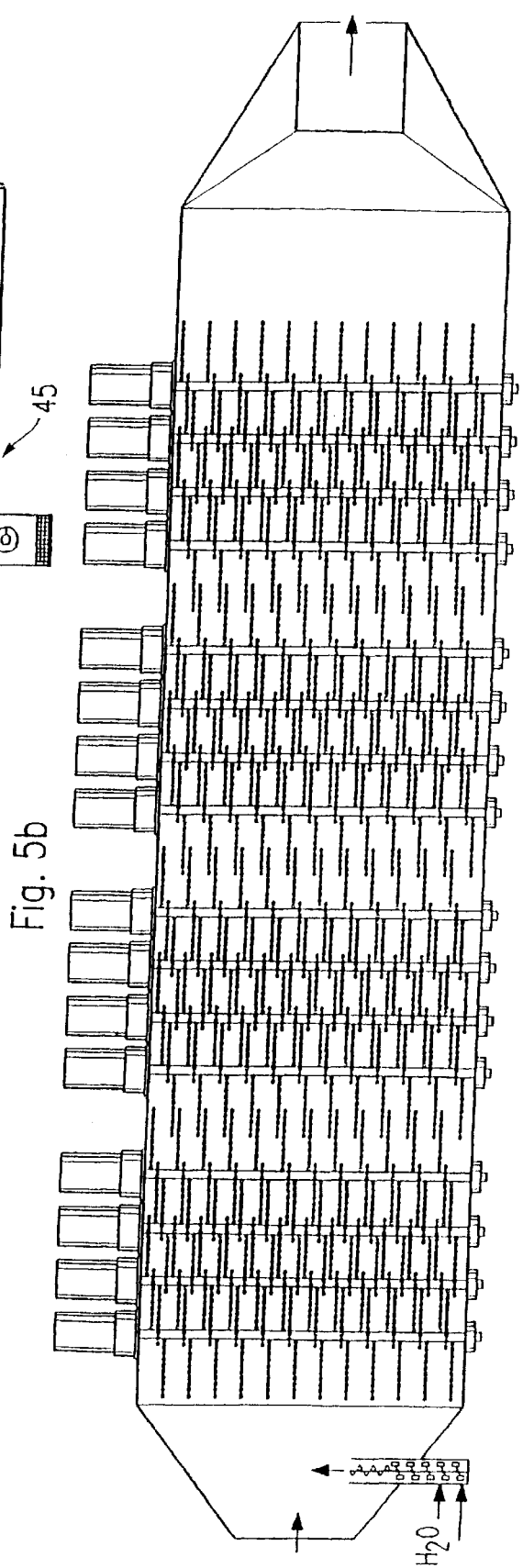
Fig. 5a
Fig. 5b

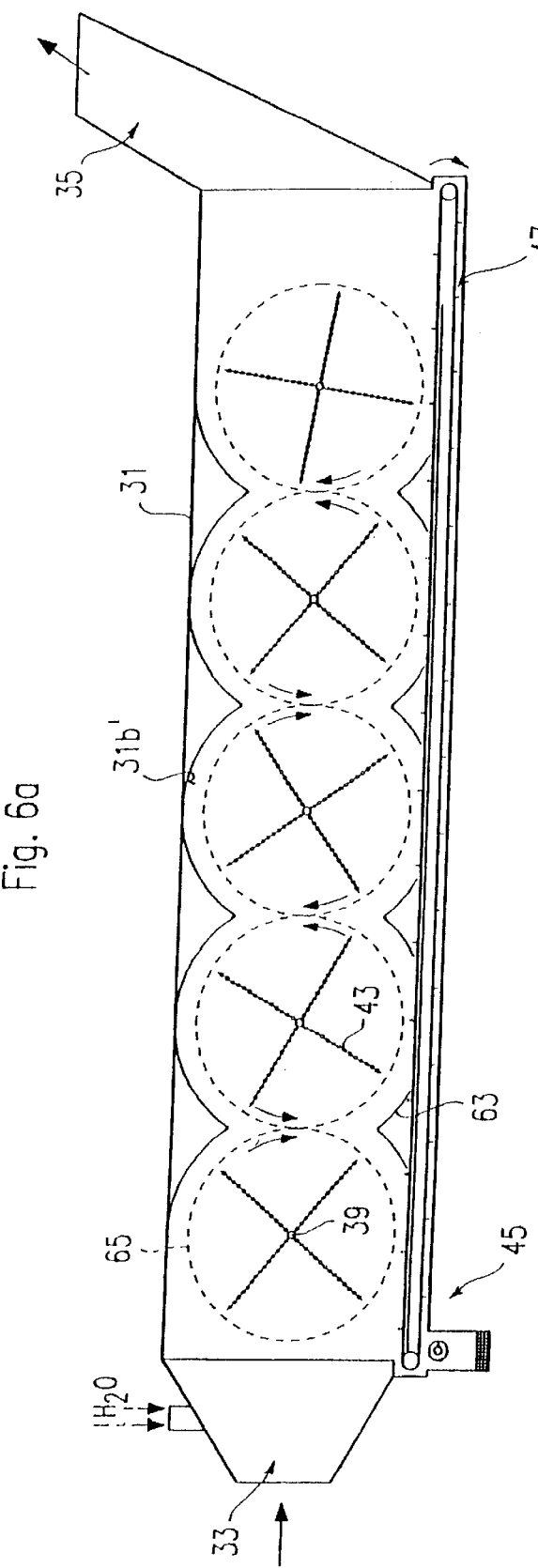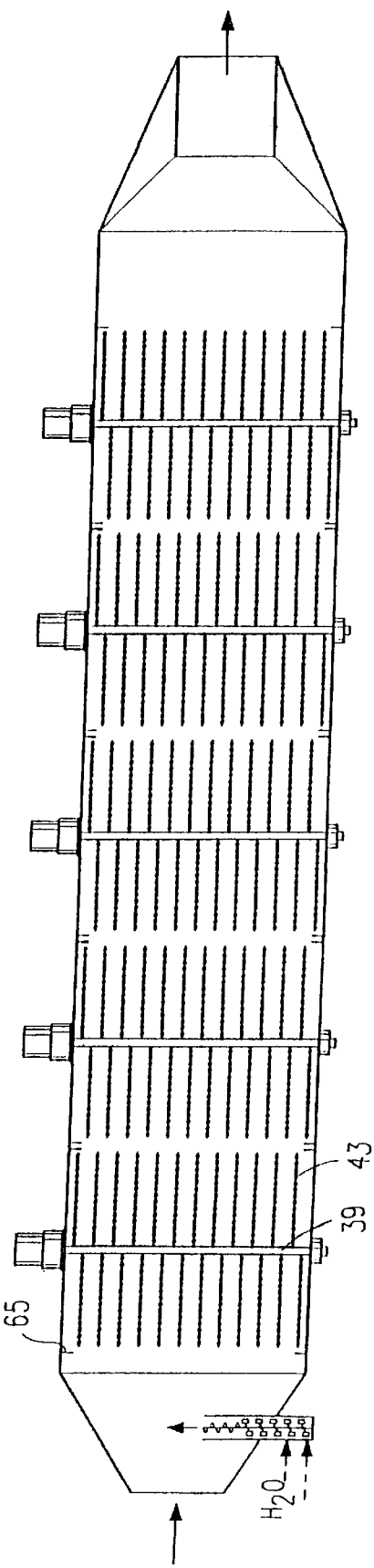
Fig. 6a
Fig. 6b

DEVICE FOR CLEANING OF FLUE GAS

BACKGROUND OF THE INVENTION

The invention pertains to a device for the cleaning of flue gas and more particularly, to such a device which prevents material deposits therein.

For cleaning of flue gas, for example, for cleaning of exhaust gases from incineration systems, at present mostly wet methods, semidry methods and dry methods are being used. In this case, wet methods and semidry methods, as a rule, have higher cleaning efficiency than dry methods. However, wet or semidry methods require a greater expense for the inlet, outlet and reprocessing of the adsorbant/absorbant employed for cleaning of the raw gas. In addition, in the container in which the added adsorbant/absorbant causes the absorption or adsorption of the pollutants, there are extremely aggressive acids which attack the inside wall of the container or built-in parts located therein. The waters ejected with salts from the scrubber, must be treated in an effluent processing system, which is associated with a considerable expense which has an effect, in particular, on smaller flue gas cleaning systems.

Therefore, various methods were proposed to improve the cleaning efficiency of dry flue gas cleaning methods. For example, it is disclosed in EP-A-0 104 335 that the reaction between the pollutants contained in the raw gas and the adsorbant/absorbant can be improved when additional water is added. This takes place in such a manner that in a first step, dry, powdery reaction agent is blown in and in a second step, pure water or an aqueous solution or suspension or a reaction medium is sprayed in. Due to the water added in the second step, a reactivation of particles of the reaction medium can be achieved. Due to the addition of water, the reaction medium can be used more efficiently.

The disadvantage in this case is that the added quantity of water must be kept as small as possible so that even at relatively low initial of the exhaust, the dew point temperature will be maintained. If this is not observed, then there will be damage to the system due to the forming of aggressive, aqueous acids.

Furthermore from EP-A-0 029 564 it is known that due to an intensive mixing of the raw gas with the added, dry adsorbant/absorbant, an increase in the relative speed between the gas and the adsorbant/absorbant particles, and thus an improvement in the reaction rate or of the cleaning efficiency can be achieved. In this regard it is proposed in EP-A-0 029 564 to allow sound to influence the reactants.

From DE-A-32 32 080 it is known that through partial, external return of the adsorbant/absorbant or of the deposited solids, an improvement in utilization of the adsorbant/absorbant and thus ultimately a savings in adsorbant/absorbant can be achieved.

To improve the cleaning efficiency, in EP-B-0 203 430 a method or a device for cleaning of flue gas is proposed, whereby the ratio of the dwell time of an adsorbant/absorbant supplied to the reactor, to the dwell time of the flue gas in the reactor, is controlled and/or regulated in that built-in parts are provided in the reactor which move with respect to the reactor container, for example, in the form of a rotating worm. This worm can be driven at a speed of about 0.5–120 rpm, whereby the adsorbant/absorbant is stored partly on the surface of the worm gear; however, it is constantly swirled up by the flue gases to be cleaned, or by additionally injected compressed air. Thus the dwell time of the heavier adsorbant/absorbant particles can be controlled or regulated relative to the dwell time of the gas in the reactor.

However, the disadvantage of this device or of this method, is that with increasing operating time of the reactor, a hard layer forms on both the internal wall of the container and also on the surface of the moving built-in parts; this layer forms due to the solids located in the reactor. This extremely hard and tough layer can practically only be removed by using mining tools.

Operating experiences with the aforementioned devices or methods have shown that a uniform atomizing pattern of the sprayed water and a uniform distribution of the solids with respect to the flue gas quantity cannot be attained. Due to the resultant irregular and ineffective mixing of flue gas and adsorbant/absorbant, it is unavoidable that wet zones lead to baked-on deposits and dry zones have unsatisfactory absorption.

SUMMARY OF THE INVENTION.

It is an object of the present invention is to create a device for the cleaning of flue gas, in particular for dry cleaning of flue gas, which has a high cleaning efficiency and in which adverse effects on operation due to deposits on the inner wall of the container or on moving parts are prevented.

The invention is based on our finding that the presence of flexible turbulence elements, which are surrounded by the moving built-in parts, inherently prevent, or greatly reduce, the formation of interfering layers and then due to a change in shape of the flexible swirling elements, said layers can be easily removed.

Furthermore, any layer perhaps forming on the inner wall of the container can never interfere so much with the operation of the device so that a movement of the moving built-in parts will be impacted to a significant extent, as is the case, for example, in the device according to EP-B-0 203 430, when the rotating worm comes into contact with a layer forming at the inner wall of the container.

The production of deposition layers on the flexible turbulence elements can be prevented, for example, by providing at certain time intervals a change in the motion speed of the turbulence elements, so that the shape of the flexible elements will change and thus any already produced, thin deposition layers will blasted off.

In the preferred embodiment of the invention, the flexible turbulence elements are designed as chains or cables which are located at one or several rotating, driven shafts. Thus the attained advantage is a mechanically simple and low-cost design, whereby in particular the formation of the turbulence elements as chains will mean that in the event of a change in the direction of rotation or of the speed of rotation, a change in the position of the chain links will occur with respect to each other and with respect to the shaft, so that any already produced deposition layers will be blasted off or removed by abrasion.

In addition, the advantage is obtained that deposition layers produced on the inner wall of the container will again be knocked off by the chain links, as soon as these layers have become so thick that they come into contact with the chain ends.

Thus the invention offers the advantage of a self-actuated cleaning of both the flexible turbulence elements and also of the inside wall of the container.

The rotation of the flexible turbulence elements takes place at such a speed that due to the resulting swirling of the raw gas-adsorbant/absorbant mixture, the reaction speed and thus the degree of cleaning will be improved due to the resulting high relative speeds between the adsorbant/ absorbant particles and the raw gas. In contrast to the rigidly moved built-in parts according to EP-B-0 203 430, the flexible turbulence elements of the device according to this invention are used in the first place, to achieve a sufficient swirling of the raw gas adsorbant/absorbant mixture. Of course, due to the corresponding selection of the rotation speed of the flexible turbulence elements and of the thereby resulting lengthening of the path of the adsorbant/absorbant particles in the raw gas to be cleaned, the ratio of dwell time of the adsorbant/absorbant to the dwell time of the gas in the reactor will also be controlled within certain limits.

Furthermore, the advantage is attained of a smaller pressure difference between gas inlet side and gas outlet side of the container, since no fixed built-in parts of any kind are necessary which will result in an inherent pressure drop.

Furthermore, due to the use of flexible turbulence elements, a large loading of the flue gas with adsorbant/absorbant is possible, since due to a high rotation speed or motion speed of the turbulence elements, a high degree of swirling is attained and a formation of deposition layers within the container need not be feared. Due to the high throughput of dust-like solids, a large loading with returned adsorbant/absorbant (i.e. adsorbant/absorbant with only partly adsorptive or absorptive properties) will occur, whereby the stochiometric ratio of the still active part of the adsorbant/absorbant to the quantity of the substances to be adsorbed or absorbed, can be near a value of one due to the high level of swirling, preferably in a range between 1.0–1.5. Thus we attain the advantage of an optimum utilization of the adsorbant/absorbant since it can be kept within the cycle for a relatively long time.

Due to the high speeds of rotation or movement of the flexible turbulence elements, in addition to the abrasion caused by the impacting of adsorbant/absorbant particles with each other, there is also a blasting of larger adsorbant/absorbant particles, in addition to the release of adsorbant/absorbant particles from surface layers inactive with respect to the desired adsorption or absorption. Thus the generation of new, active surfaces is possible.

Finally, with the invented device we have the additional advantage of an easy dismounting of the moveable built-in parts, since, for example, the shafts can be attached to the container by means of small diameter flanges, so that after dismounting of a flange, the shaft plus the flexible turbulence elements can be removed. Due to the flexibility of the turbulence elements, only an opening of relatively small size is needed for this and thus a flange of small diameter is required.

Finally, due to the absence of rigidly moving built-in parts, we have the advantage of a good accessibility of or access to the container when it is stopped, since the flexible built-in parts hang downward due to the action of gravity and leave enough space for a good accessibility or access. Repairs within the container or a replacement of the flexible elements are thus possible in a simple manner.

Since during a shutdown of the system, the flexible turbulence elements cannot block the passage of the device for the raw gas, the result is, furthermore, an operating dependability even when the turbulence elements are stopped, even though they are at reduced efficiency.

The formation of the flexible turbulence elements as chains or cables leads to the advantage of low-cost replacement parts.

In one embodiment of the invention, the flexible turbulence elements are arranged along a helical line along the perimeter of one or more shafts. Thus we have the advantage of a flow component produced upon rotation of the shaft and moving to a certain extent in the conveyance direction of the worm. Of course, several sectors of these screws can be attached to one shaft whose conveyance direction can also be opposing.

In the preferred embodiment of the invention, the flexible turbulence elements are organized into several groups on one or more shafts, each in an axial direction of the shafts, whereby preferably the groups of each shaft are located between two planes perpendicular to the shafts each in the same axial sectors. If the shafts are positioned parallel to the longitudinal axis of the container, then in the direction of the gas flow, this factor will thereby produce zones of extremely turbulent swirling and calmer zones, so that extremely high relative speeds occur between the adsorbant/absorbant particles and the flue gas, in particular at the boundary interfaces.

The container in the device according to this invention can be employed both prone or also standing, so that the device can be very flexibly adapted to the existing space requirement.

In a preferred embodiment of the invention, the container has a wall whose inside is cylindrically designed or consists of several partly cylindrical regions. In this case, each shaft is provided essentially in the axis of the cylinder and/or of a partial cylinder. Thus we have the advantage that in the case of a corresponding design of the length of the turbulence elements with suitable selection of the speed of the shaft or of the shafts, layers building up at the inner wall of the container cannot continue to build up beyond a preset thickness, since the ends of the rotating turbulence elements will cause a diminution of the layers. Thus a self-cleaning effect can be achieved.

If the wall is constructed of several partly cylindrical regions and if several shafts are provided with turbulence elements, then we have an improved swirling of the gas adsorbant/absorbant mixture. Due to the formation of the inner wall in the shape of several partly cylindrical regions, in contrast to a purely cylindrical structure, a quasi-laminar flow of the mixture as a kind of rotating (screw-shaped) motion will be avoided.

But of course, any other-shaped flow control elements can be provided at the inside wall of the container, which contribute, due to a continuing change in local flow velocity, to a better swirling of the gas adsorbant/absorbant mixture.

To improve the swirling, an even number of shafts with turbulence elements can be provided, whereby mutually neighboring shafts can be driven oppositely. For self-cleaning of the turbulence elements, the rotational velocity can be changed after a previously defined time, for example, the speed can be reduced and then increased again. In the same way, after a previously determined time, the direction of rotation of the shafts can be reversed.

According to another embodiment of the device according to this invention, the container can be set up in a prone position, i.e., the longitudinal axis of the container can run essentially horizontally, and the shafts can be positioned perpendicular to the longitudinal axis of the container. In this embodiment, the container can have an essentially rectangular cross section, whereby the walls of the container located parallel to the shafts have inner sides which consist of several partly cylindrical regions. Each shaft in this case is provided preferably essentially in the axis of a cylinder part. In this case, in an analogous manner, the advantages discussed above will be obtained. The shafts in this embodiment can, of course, be arranged in the vertical and/or horizontal directions.

In order to prevent, or allow only very little swirling of the mixture at the insides of the walls of the container perpendicular to the shafts, flow control elements can be provided at these insides, or regions of the insides can be shaped accordingly. In a simple embodiment, these flow control elements can, in turn, be formed as circle-cylindrical walls which are arranged coaxial to the shafts.

These embodiments with shafts arranged perpendicular to the longitudinal axis of the container (whether for vertical or horizontal arrangement of the container) offer the added advantage that a modular structure of the container is possible. Depending on the desired cleaning power or desired purity of the cleaned gas, a required number of modules can thus be combined into one container. This will significantly reduce the costs for planning and building of a flue gas cleaning system. Furthermore, subsequent changes to an existing system will be possible by simple and low-cost means.

In the preferred embodiment of the invention, at least one inlet opening is provided each for the raw gas and the adsorbant/absorbant. But of course, the mixing of the adsorbant/absorbant with the raw gas can also take place at a location connected by an inlet to the container.

In the embodiment of the invention with a standing container, the cleaning of the gas can occur, of course, in a uni-flow or counterflow principle, whereby the flow direction of the gas can run either from bottom or top, or vice-versa. The inlet openings for the adsorbant/absorbant and the inlet or outlet of the gas are in this case located in the appropriate manner.

In the embodiment of the invention with prone container, essentially only the cleaning in a uni-flow principle will come into consideration, since due to the gas flow, a conveyance of the adsorbant/absorbant particles will occur.

In the preferred embodiment of the invention, in a bottom region of the container there is a collection device for the adsorbant/absorbant, which has preferably a conveyor which extends across the entire length of the bottom region of the container or across a bottom region neighboring the gas outlet side. If necessary, the conveyor can be partly covered by means of one or several pieces of covering sheet metal.

The collection device is thus preferably designed so that a predetermined part of the adsorbant/absorbant can be supplied to the container in the form of a cycle, whereby the adsorbant/absorbant located in the collection shaft is used to maintain the pressure difference between the gas inlet side and the gas outlet side of the container. This, then, will prevent gas from moving via the external inlet path of the adsorbant/absorbant and the collection device in the direct vicinity of the gas-removal opening into the container, without having to pass through the correct "cleaning path."

The inlet opening of an adsorbant/absorbant inlet device is provided at the container of the device according to the invention. Through this adsorbant/absorbant inlet device the necessary quantity of adsorbant/absorbant is brought into the container and that portion of the adsorbant/absorbant which is ultimately removed from the collection device for disposal, is replaced in the form of fresh, unspent adsorbant/absorbant.

At the same time, the adsorbant/absorbant inlet device can be composed of a device for admixing water up to a predetermined moisture content, so that a reactivation of the adsorbant/absorbant dried as a result of the last passage through the container will be achieved. In this case, the result can be a reactivation of the already reacted surface of the adsorbant/absorbant particles, and secondly, the water from the adsorbant/absorbant particles will be sucked into the interior of the particles due to capillary action, so that as a result of the sudden heating after inlet into the interior of the container, there will be a sudden evaporation of the water. Thus the particles will be blown apart ("popcorn effect") and thus an enlargement of the adsorbing or absorbing surface area will be achieved.

Due to the addition of water directly to the adsorbant/absorbant, before it is introduced into the interior of the container, the additional advantage is attained that a relatively high moisture quantity can be supplied into the container, without an outwardly noticeable material moisture occurring. The macroscopic structure of the adsorbant/absorbant present in the cycle remains unchanged, dry and finely powdered, i.e., the adsorbant/absorbant remains swirlable just like dry dust. Of course, the same is also true for the produced, aggressive, aqueous acids. In this manner we can mostly prevent the interior walls of the container and/or the moving built-in parts from being attacked by the produced, aggressive substances. Of course, it is quite possible that layers of the adsorbant/absorbant can settle on the flexible turbulence elements in the turbulent region. However, this is not a disadvantage due to the formation of the flexible, turbulence elements.

This method of admixing of water into the adsorbant/absorbant before its inlet into the container and the necessary devices for this, can, of course, be used in combination with known, dry flue gas cleaning methods and devices. Of course, the advantage of a high cleaning efficiency due to the high and effective throughput of adsorbant/absorbant possible with the invented container, cannot be achieved in association with the known containers.

If calcium hydroxide ($Ca(OH)_2$) is used as adsorbant/absorbant, then instead of a device for admixing of water, a device for admixing milk of lime can be provided. In other words, the necessary addition of fresh adsorbant/absorbant in the form of dry calcium hydroxide and the separate addition of water can be replaced in that milk of lime can be added in a single addition step. Thus the expense for the adsorbant/absorbant inlet device will be reduced, and secondly, we obtain the added advantage that the milk of lime for addition can be produced from calcium oxide (CaO) and water. Therefore, it is necessary to deliver to the filter plant only calcium oxide (it is assumed, here, that water will be available on site anyway), whereby the required quantity of calcium oxide is far less than the comparable, needed quantity of calcium hydroxide.

In this case, to start up the plant, it is necessary that the collection shaft of the collection device be filled with dust-like adsorbant/absorbant before the initial operation.

Due to the special formation of the moving built-in parts as flexible built-in parts which makes possible a high throughput of adsorbant/absorbant, in a device according to this invention, also calcium silicate hydrate (CaSiOH) up to a grain size of 5 mm and more can be used as adsorbant/absorbant. Calcium silicate hydrate precipitates in this form as waste in the production of aerated-concrete and thus represents a very low-cost adsorbant/absorbant. Due to the thus occurring, relatively large particles, their use with known apparatuses was not possible or was not profitable due to the necessary processing of the calcium silicate hydrate.

BRIEF DESCRIPTION OF THE DRAWINGS

The invention will be explained in greater detail below based on the design example presented in the figures. The figures show:

FIG. 2b cross section through the container);

FIG. 3 a partial cross section through the adsorbant/absorbant collection device according to line I—I in FIG. 2a;

FIGS. 5a, 5b: an additional embodiment of the invention with prone container in the representation according to FIGS. 4a, 4b; and FIGS. 6a, 6b: an additional, simplified embodiment of the invention with prone container in the representation according to FIGS. 4a, 4b, 5a and 5b.

DESCRIPTION OF THE PREFERRED EMBODIMENTS

Figure 1:
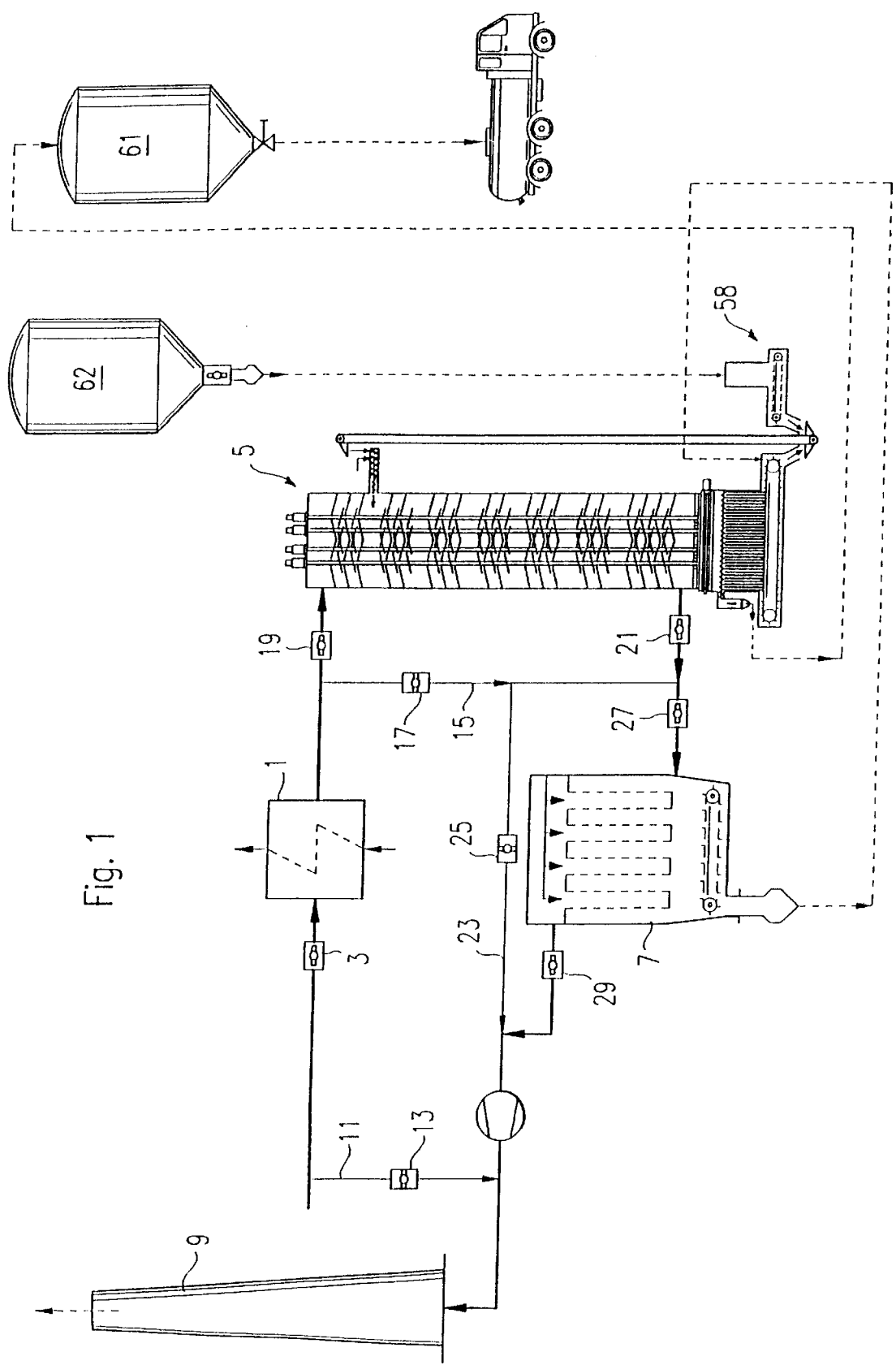
FIG. 1: a schematic representation of the entire system for cleaning of flue gas.

The overall system illustrated in FIG. 1 for cleaning of flue gas consists essentially of a precooler 1, and the raw gas to be cleaned is sent to it through a valve 3 in the direction of the arrow and of the actual device 5 for cleaning of the flue gas, with a solids separator 7 outlet connected to it. The cleaned flue gas is then output through a smokestack 9. Of course, due to a parallel circuitry of several devices 5, the cleaning power can also be increased, or the cleaning of the gases can be improved by a series circuiting of several devices 5.

The path of the gas through the system in normal operation is indicated in FIG. 1 by the thick, solid lines and arrows.

The thin, solid lines represent paths which ensure the operational dependability in case of malfunction of one or more components. For example, the line 11 and the associated valve 13 pertain to an emergency bypass, with which the entire system can be bridged and the raw gas can be sent directly to the stack 9.

By means of the line 15 and the associated valve 17, in association with an appropriate control of the valves 19 and 21, it is possible to bridge the device 5.

Finally, by means of the line 23 and an associated driver of the valves 25, 27 and 29, it is possible to bridge the solids separator 7.

The device 5, which is illustrated in FIG. 2a, is composed of a container 31 and the raw gas is supplied to it in the direction of the arrow through an inlet opening 33. The cleaned, raw gas is sent through an outlet opening 35 in the lower region of the container 31 and to the solids separator 7 (FIG. 1), which can be designed, for example, as a cloth filter. Dry or quasi-dry dust-like or powdered adsorbant/absorbant can be supplied to the container 31 through an adsorbant/absorbant device 37.

Since the adsorption and/or absorption of harmful pollutants in the raw gas is improved by the adsorbant/absorbant particles, when they have a certain moisture, in the adsorbant/absorbant supply device 37 under admixing of the adsorbant/absorbant, water is added until a predefined moisture content is achieved. Of course, this can take place independently in the form of a closed control circuit, whereby the moisture content can be selected depending on certain parameters, for example, the temperature of the supplied raw gas. In this manner, the moisture content of the adsorbant/absorbant before the inlet into the interior of the container 31 can be increased, for example, up to the limit of the presence of a dust-like structure. However, the adsorbant/absorbant in this case is still in dust-like or powder form, so that as before, a large, active surface area is available for the cleaning.

Since a high relative speed between the adsorbant/absorbant particles and the raw gas is desirable to increase the efficiency, in the longitudinal axis of the container 31 there are several (in the illustrated example, four) shafts 39 which run parallel to the longitudinal axis of the container. The shafts are rotated by means of driven electromotors 41 which are provided at the top side of the container 31.

To swirl up the gas adsorbant/absorbant mixture, chains 43 are provided on the shafts 39 inside the container. These chains hang down due to gravity when the shafts are stopped, and extend due to the action of centrifugal force, outward when the shafts rotate. Of course, instead of chains, any other kind of flexible turbulence elements can be used, for example, cables. However, chains offer the advantage that due to the leads in the chain links, a more intensive swirling can be obtained. Also, smaller, rigid or flexible elements can be attached to the flexible turbulence elements (in a manner not illustrated) to increase the air resistance.

As illustrated in FIGS. 2a, 2b, the container 31 can have a wall 31a whose inside wall has several partly cylindrical regions 31b. The four shafts are then arranged, as illustrated in FIG. 2b, preferably in such a manner that they reside in the axis of the partly cylindrical regions 31b.

Firstly, this will ensure that the gas, as a result of the swirling by the turbulence elements 43 of each shaft, will be directed from the inner wall of the regions 31b back in the direction of the container middle. To improve the swirling, neighboring shafts 39 can be driven with an opposing sense of rotation, as illustrated in FIG. 2b. The turbulence elements 43 designed as chains are then selected preferably to be long enough so that their outer ends describe an outer circle—at a predefined speed—whose diameter is only slightly smaller than the inner diameter of the partly cylindrical regions 31b. In the course of the operation of the device, if adsorbant/absorbant layers build up on the inner wall of the container 31, then these layers will be knocked off by the chain ends as soon as the layer thickness exceeds a particular value. In each case, compared to the use of rigid turbulence elements, even given larger layer thicknesses, the motive power needed for movement of the shafts 39 remains essentially unchanged.

In order to prevent the build-up of thicker layers on the turbulence elements 43, as already mentioned, the direction of rotation of each shaft 39 can be reversed at certain time intervals, or the speed of rotation can be changed. Thus, a change in shape of the flexible turbulence elements 43 will be obtained, so that the potentially deposited layers will be blasted off.

As indicated in FIG. 2b, the shafts 39 can have a synchronized operation, with regard to their rotational motion, so that the chains 43 do not beat against each other in the middle of the container. For cleaning purposes, this synchronization can also be ceased for a short time, so that the chains will clean each other by means of mutual impacts.

In the axial direction of the shafts 39, the chains can be uniformly distributed, for example, so that to avoid imbalances or flexure of the shafts, a symmetrical arrangement of chains in a plane perpendicular to the shaft is preferred. As illustrated in FIG. 2b, for example, four chains can be provided in one plane. The chains 43 can also have different lengths in order to achieve the desired swirling effects.

As illustrated in FIG. 2a, the chains can be arranged in groups in the axial direction, whereby zones of large turbulence will alternate with calmer zones. In particular in the transition layers, high relative speeds will be produced between the adsorbant/absorbant particles and the gas.

Figure 3:
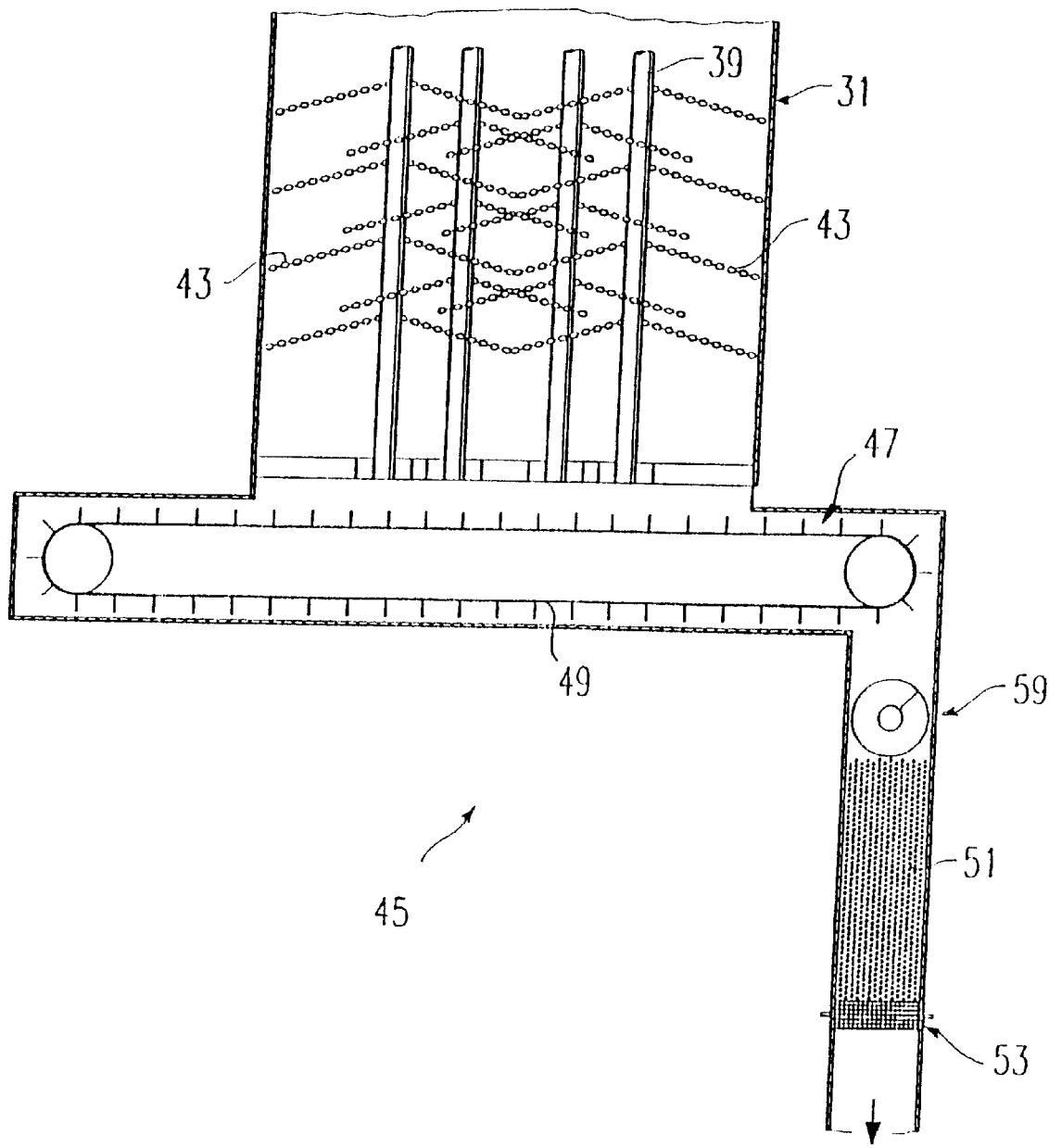

At the bottom end of the container 31 there is a collection device 45 for the adsorbant/absorbant, which comprises a conveyance device 47—as clearly indicated in FIG. 3—which supplies the adsorbant/absorbant collecting on the conveyor chain 49 (partly laden with pollutants) to a collection shaft 51. The conveyor chain 49 extends preferably across the entire bottom surface of the container 31.

At the bottom end of the collection shaft 51 there is an additional conveyance device 53, which uses an additional conveyor chain 55 to again supply the adsorbant/absorbant to the adsorbant/absorbant inlet device 37. The latter can comprise, for example, a conveyor path 57 designed as a bucket conveyor. The dust-like product—which consists essentially of adsorbant/absorbant—deposited by means of the solids separator 7 (FIG. 1), is supplied to the conveyor path 57. Thus an optimum utilization of the adsorbant/absorbant will result.

Furthermore, the adsorbant/absorbant supply device 37 is composed of an inlet device 58 for fresh material, that is, fresh adsorbant/absorbant. This fresh material supply device can, as shown in FIGS. 1 and 2a, supply the fresh material to the underside of the conveyor path 57 from an adsorbant/absorbant silo 62 (FIG. 1). But of course, the inlet of fresh material can also occur at any location between the adsorbant/absorbant inlet opening and the adsorbant/absorbant collection device 45. The quantity of fresh material supplied to the adsorbant/absorbant already present in the cycle can be controlled or regulated as a function of particular parameters, e.g., the quantity of pollutants to be adsorbed or absorbed.

In addition, by means of the adsorbant/absorbant supply device 37, water up to a particular moisture content, can be added to the adsorbant/absorbant already present in the cycle, in the manner described above.

A fraction of the produced reaction product corresponding to the inlet and outlet quantity, is sluiced out of the adsorbant/absorbant cycle from the collection shaft 51—as illustrated in FIG. 3—by means of an outlet device 59, which can be composed of a conveyor worm, for instance, and then sent to the residual silo 61 (FIG. 1) for disposal. The quantity of adsorbant/absorbant present in the cycle will thus be kept essentially constant.

Due to the adsorbant/absorbant layer present in the collection shaft 51, at the same time it is possible to maintain the pressure difference between the inlet opening 33 and the outlet opening 35 for the gas and in this manner to prevent the raw gas from moving via the adsorbant/absorbant inlet device 37 and the collection shaft 51 in the direction of the outlet opening 35, without having passed through the correct cleaning procedure.

The above design of the adsorbant/absorbant supply device 37 and of the adsorbant/absorbant collection device 45 will ensure the desired, high-level adsorbant/absorbant throughput through the container 31. Of course, these elements can also be used with known containers 31.

Viewed as a whole, with regard to a device according to this invention, not only an improvement of the cleaning efficiency with simultaneously simple design of the device will result, but rather also an improvement in the utilization of the adsorbant/absorbant due to the reactivation in the adsorbant/absorbant supply device. Each adsorbant/absorbant particle passes several times through the container 31 and contributes repeatedly to a cleaning of the gas. The adsorbant/absorbant thus remains—given an appropriate total quantity of adsorbant/absorbant within the cycle—for a relatively long time in the cycle (two days and more), so that the additional advantage is obtained that resulting reaction products will be oxidized by the residual oxygen present in the gas and due to the moisture. For example, calcium sulfite ($CaSO_3$) present in the adsorbant/absorbant will be oxidized to calcium sulfate ($CaSO_4$). This will occur right within the adsorbant/absorbant cycle. An outlet-connected step for oxidation of the spent adsorbant/absorbant removed by the outlet device 59 is thus not necessary.

Figure 2:
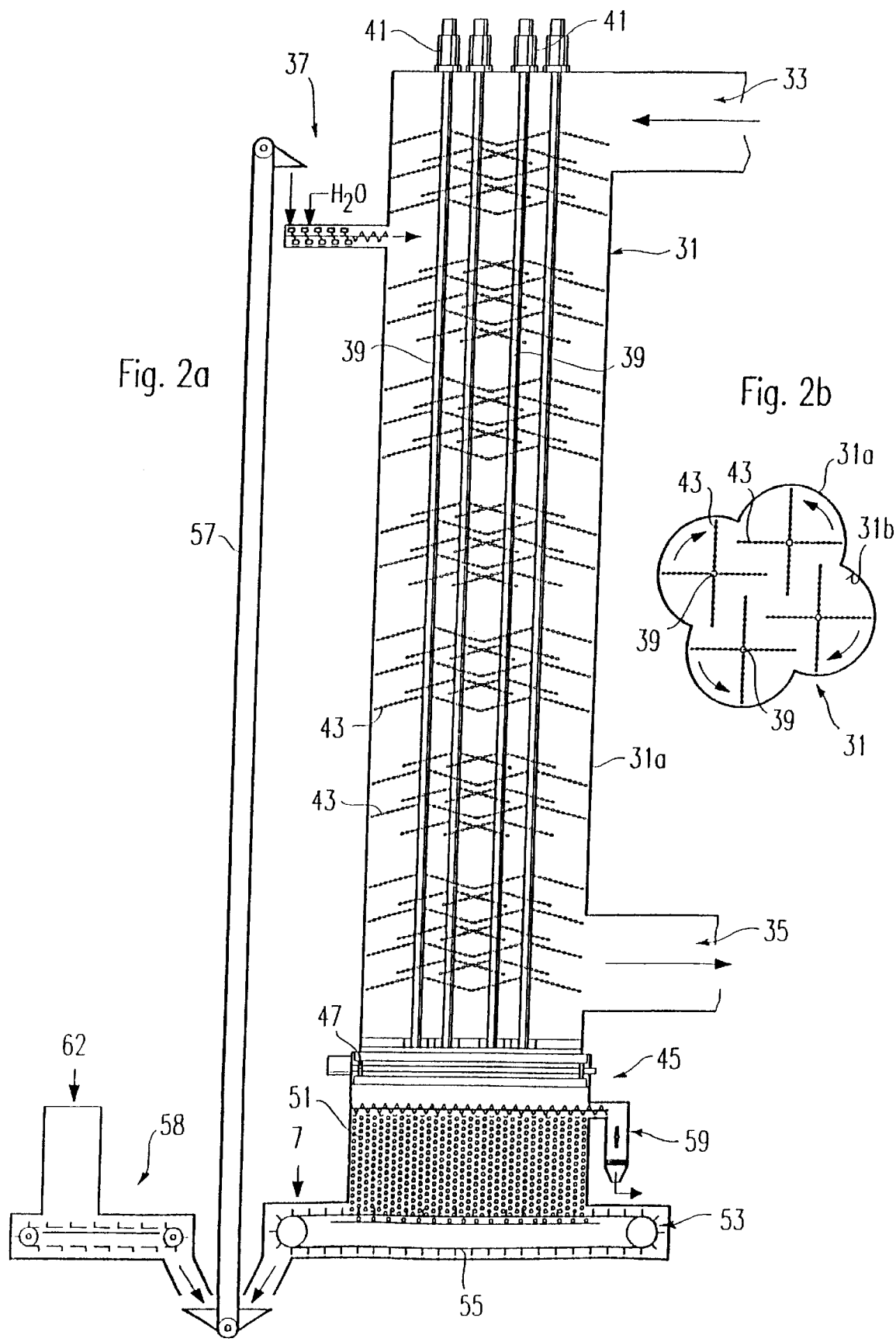
FIGS. 2a, 2b: a representation of a first embodiment of the device according to this invention, shown in cross section (FIG. 2a longitudinal cross section.
Figure 4A:
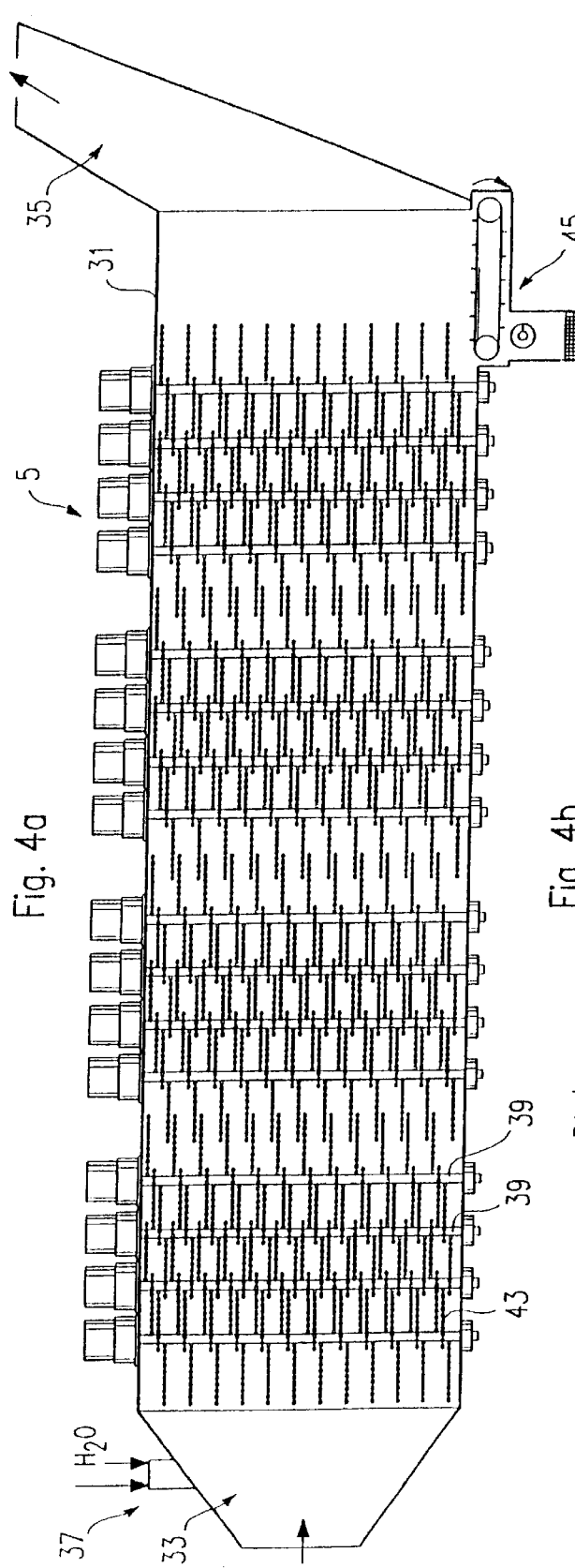
FIGS. 4a, 4b: an additional embodiment of the invention with prone container in two longitudinal cross sections shown in two mutually perpendicular planes.
Figure 4B:
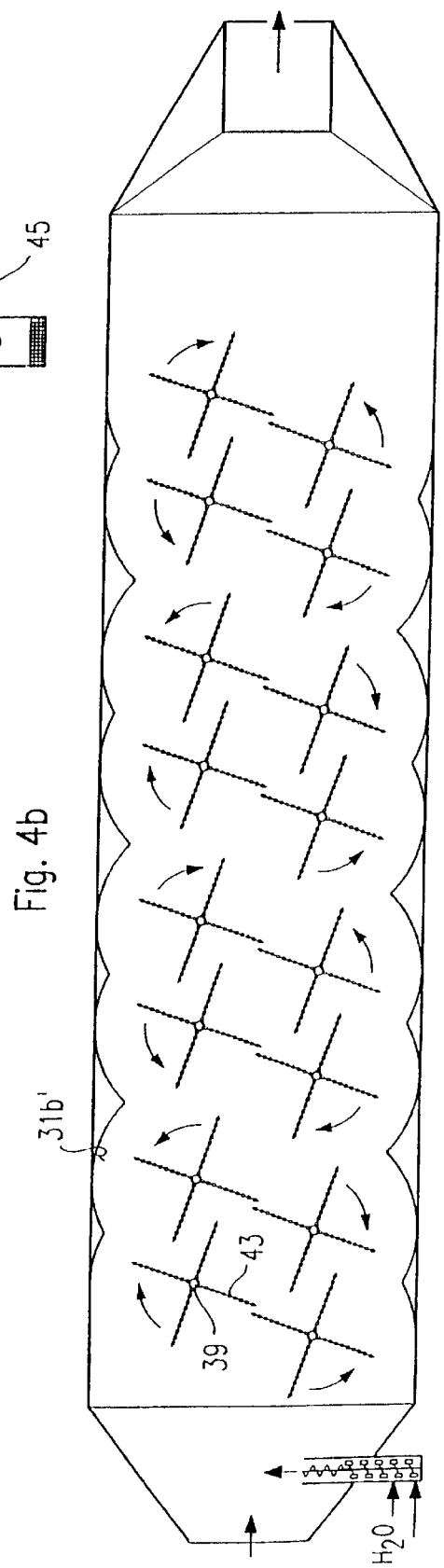

Now let us turn to the additional design example of the invention presented in FIG. 4a and 4b, where we will discuss solely the differences to the design example according to FIGS. 2 and 3. In particular, essential parts of the collection device 45 for the adsorbant/absorbant and the adsorbant/absorbant supply device 37 remain in principle unchanged.

As illustrated in FIG. 4a, the container 31 of the device 5 is positioned prone, whereby the shafts 39 are positioned perpendicular to the longitudinal axis of the container in a vertical direction. The propulsion of the shafts remains essentially unchanged.

Due to the prone formation of the container 31 there results the advantage that the bearing of the shafts can be placed outside of the container interior, in particular also at the underside, and thus the bearings are protected against aggressive gases. The inlet opening 33 for the raw gas initially expands up to the entire cross section of the container 31, so that a reduction in the rate of flow will be achieved. In this manner, the gases to be cleaned remain within the container 31, which contributes to an increase in the cleaning effect.

The chains 43 provided on the shafts 39 are positioned essentially at equidistant, axial intervals around the shafts and are distributed along the perimeter of the shaft, so that an imbalance will be avoided. But of course, in this design as well, in each plane there are several, for example, four, chains so that in each plane perpendicular to the shaft, an imbalance will be precluded.

As is evident from FIG. 4b, the inner walls of the container parallel to the shafts 39, are again equipped with partly cylindrical sections 31b', so that the advantages described above will be obtained.

In order to prevent the formation of calm zones with respect to the swirling, the container interior walls running perpendicular to the shafts can have along these interior walls (as explained in association with FIGS. 6a and 2b flow control elements (not illustrated) which prevent an unhindered gas flow in the direction of the gas outlet openings 35.

In the bottom wall of the container 31, in the vicinity of the gas outlet opening 35, there is a collector device 45 for the adsorbant/absorbant. This device, in turn, is composed of a conveyor device 47 which extends over the entire width of the container 31. Furthermore, the collection device 45 is unchanged, likewise also the adsorbant/absorbant inlet device 37. For reasons of conciseness, the representation of the cycle for the adsorbant/absorbant was omitted.

In this embodiment of the invention, essentially only an operation according to the uniflow principle will be possible.

With regard to the device according to FIGS. 4a and 4b the supplied adsorbant/absorbant particles repeatedly settle on the bottom wall and are repeatedly swirled up. Thus the adsorbant/absorbant particles are carried along by the gas stream in the direction of the gas outlet opening 35. Since in the rear region of the container 31, i.e., in the region of the collection device 45 no more rotating shafts are provided, the adsorbant/absorbant particles mostly settle onto the conveyor chain of the collector device 45. Those particles which are carried along by the gas stream in the direction of the gas outlet opening 35, will settle, due to the force of gravity, through the slanting, upward-directed formation of the exhaust channel, in the course of time, onto the lower wall of the outlet channel and will then slide down along this wall, due to the relatively great steepness, in the direction of the collection device 45. In this manner it will be assured that the majority of the adsorbant/absorbant will get into the collection device 45. The fraction of the adsorbant/absorbant, in particular the smaller adsorbant/absorbant particles, carried off by the gas stream through the gas outlet opening in each embodiment, will then be regenerated via the solids separator 7 (FIG. 1).

The embodiment according to FIGS. 5a and 5b differs from the embodiment according to FIGS. 4a and 4b solely in that the shafts 39 are positioned horizontal and perpendicular to the longitudinal axis of the container 31. Thus, the reader is referred to the above description.

As illustrated in FIG. 5a, the collection device 45 for the adsorbant/absorbant is provided with a longer conveyor chain which is driven until the adsorbant/absorbant located on the conveyor chain is moved in the direction of the container end, and from there is conveyed to the underside of the conveyor chain in the direction of the collection shaft. This will then mean that the concentration of the adsorbant/absorbant particles in the region of the shafts 39, which are located above the conveyor chain, is reduced with respect to the adsorbant/absorbant concentration in the front region of the container 31. In this manner the fraction of adsorbant/absorbant particles carried off by the gas through the gas outlet opening 35 will be reduced.

Due to the horizontal formation of the shafts 39, the chains 43 at low shaft speed, for example, during stoppage of the device, will wind up around the shafts so that an unhindered access to the interior region of the container 31 is possible. But at a higher rotational velocity, the chains will unwind due to the centrifugal force, so that in this design as well, an optimum swirling of the gas adsorbant/absorbant mixture is assured.

FIGS. 6a and 6b show a simplified embodiment of the invention with likewise prone container 31. Just as in the embodiment according to FIGS. 5a and 5b, the shafts 39 are again arranged horizontal and perpendicular to the longitudinal axis of the container 31. But in contrast to this embodiment, only a single row of shafts 39 is provided, whereby the chains are designed only to be long enough so that contact of the chains with each other is prevented. Consequently, a synchronization of the drive units for the shafts 39 can be omitted. Also, as best shown in FIG. 6b, chains 43 are axially spaced apart along respective shaft 39 such that the chains are attached to the shaft along a helical line around the perimeter of the respective shaft.

Whereas the upper wall of the container 31 again has the known partly cylindrical regions, a conveyor chain of the collector device 45 for the adsorbant/absorbant extends over the entire lower inner wall. As illustrated in FIG. 6a, this chain can be driven either so that the upper side of the conveyor chain will move in the direction of the gas outlet opening 35, so that the adsorbant/absorbant will be promoted between the underside of the conveyor chain and the container inner wall in the direction of the collector shaft of the device 45. Thus we have a relatively rapid transit of the adsorbant/absorbant, which is repeatedly swirled up from the upper side of the conveyor chain.

However, the conveyor chain can also be driven oppositely, so that the adsorbant/absorbant which settles onto the conveyor chain is repeatedly moved in the direction of the gas inlet opening 33. However, the speed of the conveyor chain will then have to be selected as greater than the average speed of motion of the adsorbant/absorbant particles in the gas stream. In this driving of the conveyor chain, the dwell time of the adsorbant/absorbant particles in the interior of the container 31 can be increased.

As illustrated in FIGS. 6a and 2b, flow control elements 63 can be provided below the conveyor chain of the adsorbant/absorbant collection device 45; these flow control elements are located in regions between the outer circular paths of the chains 43 and exert a function corresponding to the circular-cylindrical regions 31b' of the upper wall.

Furthermore, as indicated by dashed lines in FIG. 6a and also as evident in FIG. 6b, additional flow control elements 65 are provided on the lateral, inside walls of the container 31, which prevent the gas with little or no swirling, from moving along these paths from the inlet opening 33 to the outlet opening 35.

What is claimed is:

1. A device for cleaning flue gas, the device comprising:
   (a) an elongated container having at least one supply opening and at least one outlet opening, the at least one supply opening for receiving raw gas to be cleaned and an adsorbant/absorbant into the container and the least one outlet opening enabling cleaned gas to exit the container;
   (b) a plurality of rotating, driven shafts located in the container and extending perpendicular to the longitudinal axis of the container; and
   (c) each rotating, driven shaft having a plurality of flexible swirling elements connected thereto.

2. The device according to claim 1 wherein the flexible swirling elements are chosen from a group consisting of chains and cables.

3. The device according to claim 1 wherein the flexible swirling elements connected to at least one shaft are arranged along a helical line at the perimeter of said shaft.

4. The device according to claim 1 wherein the flexible swirling elements are separated into groups on at least one shaft, and the groups are separated in an axial direction on the shaft.

5. The device according to claim 4 wherein the groups of flexible swirling elements on said shaft are spaced apart in equal sections between two planes located perpendicular to the shaft.

6. The device according to claim 1 wherein the longitudinal axis of the container runs essentially vertically.

7. The device according to claim 1 wherein the longitudinal axis of the container runs essentially horizontally.

8. The device according claim 1 wherein the container has an essentially rectangular cross section.

9. The device according to claim 1 further comprising a collection device associated with the container for collecting the adsorbant/absorbant.

10. The device according to claim 9 wherein the collection device is provided at the bottom side of the container and has a vertical longitudinal axis.

11. The device according to claim 9 wherein the collection device has a horizontal longitudinal axis and is provided at a bottom region of the container.

12. The device according to claim 11 wherein the collection device includes a conveyor extending over the entire length of the bottom region of the container.

13. The device according to claim 11 wherein the collection device includes a conveyor extending over the entire length of a region neighboring a gas-removal end of the container in which the at least one outlet opening is situated.

14. The device according to claim 9 wherein the collection device conveys the adsorbant/absorbant into a collection shaft from which a predetermined portion of the adsorbant/absorbant can be recycled through the container, whereby the adsorbant/absorbant located in the collection shaft is used to maintain a pressure difference between a gas inlet end of the container in which the at least one supply opening is located and a gas outlet end of the container in which the at least one outlet opening is located.

15. The device according to claim 14 further comprising a removal device associated with the collection shaft, the removal device for removing a portion of the adsorbant/absorbant for disposal.

16. The device according to claim 14 further comprising an adsorbant/absorbant inlet device provided on the container, the adsorbant/absorbant inlet device being connected to the collection shaft.

17. The device according to claim 16 further comprising a water inlet connected to the adsorbant/absorbant inlet device for admixing water with the adsorbant/absorbant up to a predetermined moisture content.

18. The device according to claim 8 wherein the container includes walls extending parallel to the plurality of shafts, and wherein said walls have inside surfaces which consist of partly cylindrical regions, and wherein a different one of the plurality of shafts is positioned essentially at the axis of each of the partly cylindrical regions.

19. The device according to claim 8 wherein the container includes walls extending perpendicular to the plurality of shafts, and further comprising flow control elements positioned on the inside surfaces of the walls extending perpendicular to the plurality of shafts, the flow control elements extending from the respective wall inwardly into an interior of the container for diverting the flow of the gas and adsorbant/absorbant mixture toward the middle of the container.

20. The device according to claim 1 wherein at least one supply opening is provided in the container for the raw gas and at least one supply opening is provided in the container for the adsorbant/absorbant.

21. The device according to claim 20 wherein the at least one supply opening for the raw gas, and the at least one supply opening for the adsorbant/absorbant, and also the at least one outlet opening for the cleaned gas, are arranged in axial end regions of the container so that the cleaning of the raw gas takes place in a uniflow or counter flow condition.

\* \* \* \* \*